Feb. 18, 1958   T. W. SHEARER, JR., ET AL   2,824,213
CONSUMABLE ELECTRODE WELDING METHOD AND MECHANISM
Filed Oct. 30, 1956

INVENTORS
Thomas W. Shearer, Jr.
Arthur F. Kessler
BY
L. D. Burch
ATTORNEY

United States Patent Office 2,824,213
Patented Feb. 18, 1958

2,824,213

CONSUMABLE ELECTRODE WELDING METHOD AND MECHANISM

Thomas W. Shearer, Jr., Auburn Heights, and Arthur F. Hessler, Detroit, Mich., assignors to General Motors Corporation, Detroit, Mich., a corporation of Delaware Application October 30, 1956, Serial No. 619,216

11 Claims. (Cl. 219—130)

The invention relates to a method of welding separate pieces of metal together and more particularly to welding thin sheets as a part of an automatic manufacturing operation. It also relates to a mechanism using the method.

In the art of welding sheets of material together, it has been common to use an automatic electric arc welding machine. A straight wire electrode is normally used which is fed through an electrode guide to the area to be welded. The feed rate of the electrode has been controlled in conjunction with the voltage and/or current through the electric arc in order to obtain a satisfactory weld bead. So long as the edges to be welded together are accurately located relative to the line of movement of the electrode guide, the bead weld formed will be equally welded to each of the sheets. In high production use of such welding machines, however, the tolerances required to obtain a proper weld have been found to be closer than the normal tolerances obtained in forming the sheets. Variations on the order of ⅛ inch from the desired edge positions are common. A welding machine using a straight wire electrode is unable to compensate for such variations. It has been proposed to use larger cross-section area electrodes in order to cover a wider area. Serious limitations are encountered, however, which greatly curtail the possibility of using wide ranges of electrode sizes. A narrow range of operation is allowable due to the thinness of the sheets to be welded. An arc having too much energy will melt holes through the sheet materials instead of welding them together. On the other hand, the size of welding rod determines the amount of current required to provide a working arc. The larger the cross-section area of the rod, the greater amount of current must be provided to obtain a proper arc. The arc, therefore, must not exceed that which will melt the sheets and, at the same time, it must be sufficient strength to properly melt the electrode. A point is quickly reached at which an electrode is too large to be used on the material to be welded.

The method and machine herein disclosed overcomes these disadvantages and allows the use of a smaller electrode with which a wider bead may be formed to take care of the misalignment between the sheets to be welded. This is preferably accomplished by corrugating or otherwise deforming a straight wire electrode and feeding the corrugated electrode to the area to be welded in a position transverse to the direction of the bead being formed. The corrugated electrode will have the effect of moving the straight wire electrode transversely of the bead, and a wider solid bead may be formed while remaining within the operational arc limits.

Figures 1, 2:
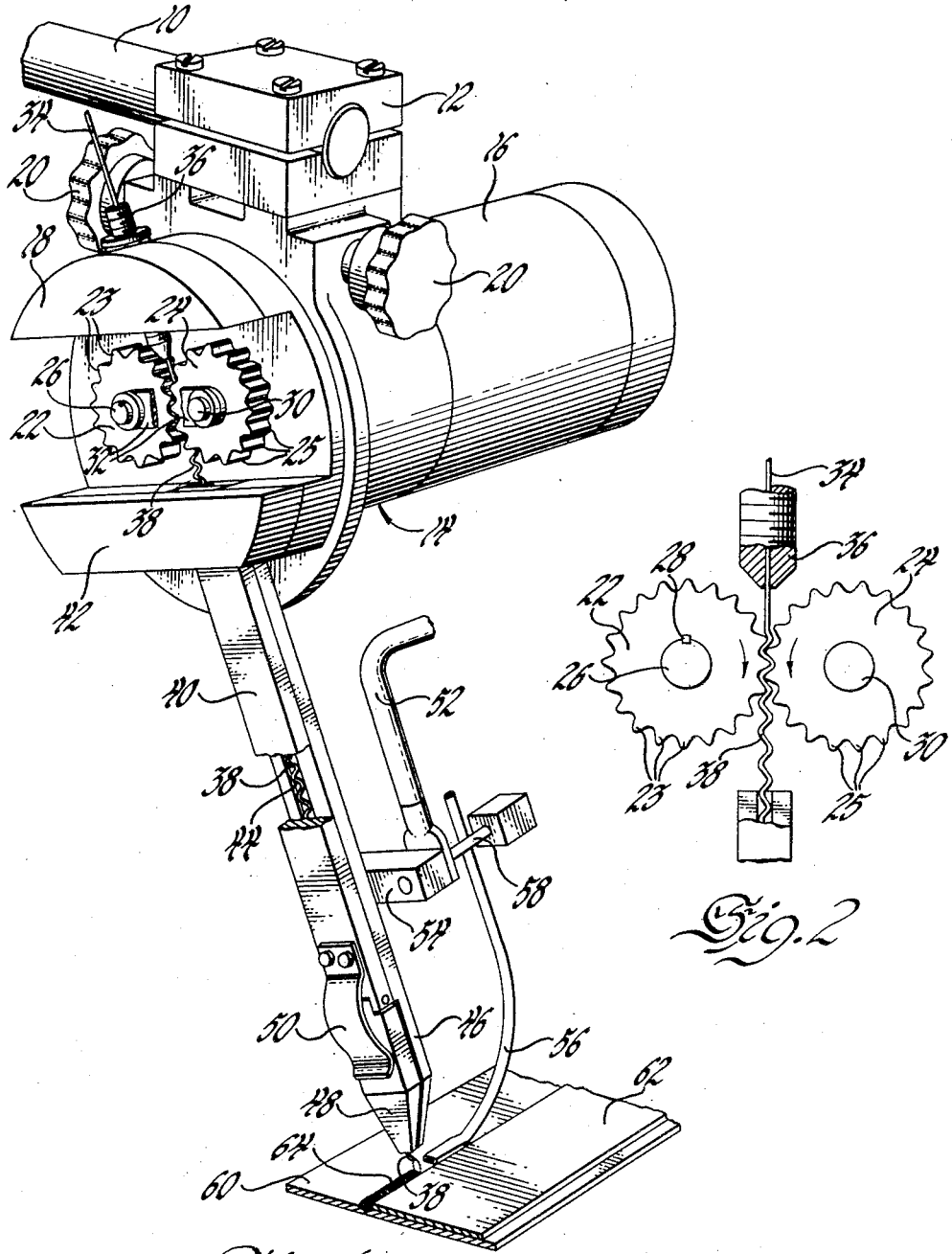
Figure 1 is a perspective view of a machine employing the method embodying the invention and having parts broken away and in section.
Figure 2 is an enlarged view of the corrugating feed rolls of the machine of Figure 1.

The welding machine shown in Figure 1 may be mounted on a feeder support arm 10 and attached thereto by feeder support clamp 12. Arm 10 may be secured to any known carriage which will permit and control movement of the electrode in a direction parallel to the direction of the weld bead being formed. The carriage movement may be manually or automatically controlled. The electrode feeder 14 is driven by feeder motor 16 and includes feeder head 18. Adjusting knobs 20 may be provided to adjust and lock feeder head 18 in any position in a plane generally transverse to the direction of relative movement of the work to be welded. Feeder head 18 is provided with intermeshing corrugating feed rolls 22 and 24. Roll 22 may be mounted on drive shaft 26 and secured thereto by any suitable means such as key 28. Roll 24 may be mounted on shaft 30 and may be freely rotatable thereon or may be secured for rotation therewith. If roll 24 is secured to shaft 30, the two rolls must be aligned in order to properly mesh. If roll 24 is allowed to rotate on shaft 30, it will be driven by roll 22 and no alignment problem is encountered. An antispreader bar 32 may connect the outer ends of shafts 26 and 30 in order to prevent spreading of rolls 22 and 24. It may also aid in keeping the two rolls in a fully meshed position by preventing relative axial movement of either rolls along its shaft. Rolls 22 and 24 are formed with pitch diameters which permit a space between the meshed teeth 23 and 25 of the rolls to be approximately equal to the diameter of straight wire electrode 34. Rolls having different pitch diameters may be substituted to allow the use of various electrode sizes. A straight wire electrode guide 36 may be secured in feeder head 18 and lead straight wire electrode 34 to a point adjacent the area of mesh of feed rolls 22 and 24. When feed motor 16 is energized, the feed rolls 22 and 24 rotate in opposite directions and electrode 34 is fed between the rolls. As the electrode passes through and beyond the area of mesh, it is deformed to the approximate shape of the teeth profiles of the rolls and is therefore corrugated. Different tooth profiles may be used to obtain different corrugated effects. The driving power of the rolls will continue to feed the deformed electrode through the mesh area and into corrugated wire electrode guide 40. The corrugated wire electrode 38 passes through guide channel 44 formed within guide 40 to the electrode guide head 46. Guide 40 is supported by electrode guide support 42 at a point on the feeder head 18 immediately beyond the mesh area of rolls 22 and 24.

Electrode guide head 46 is preferably provided with a spring biased section 48 on the side of the electrode guide toward which the weld bead has been formed. The section may be pivoted about a pin passing through a portion of the guide in a direction transverse to the direction of the weld. A cantilever-type spring 50 may be provided to bias section 48 against the end of the electrode guide head 46, however any type biasing means may be used to hold section 48 in its proper position while allowing it to swing rearwardly should such motion be required. The provision of a spring biased head section insures good electrical contact for the conduction of electric current from the electrode guide to the electrode. It also protects the electrode guide against possible damage should the electric arc be extinguished and the wire electrode extending from the guide be left in a position allowing it to be welded to the sheets.

Electrical power cable 52 may be secured to power bracket 54 which in turn may be mounted on electrode guide 40. The feeder mechanism may be electrically insulated from ground at any point beyond clamp 12. It is desirable to use a gas shield for the arc weld in order to prevent undue oxidation of the metal. Gas shield tube 56 may be mounted on tube support 58 which is attached to power bracket 54. Tube 56 may be led to a point adjacent the arc weld and allow flow of any gas, such as carbon dioxide or an inert gas, which will effectively shield the arc. Plates 60 and 62, which are to be welded together, are placed immediately beneath the end of electrode guide head 46. When the welding machine is energized, an electric arc is formed at the end of the corrugated wire electrode between that electrode and plates 60 and 62. The corrugated wire electrode 38 is consumed in the process and weld bead 64 is formed as the feeder mechanism is moved along a line parallel to the joint formed by the plates being welded.

The power supply may be of the constant potential or constant current type. In either type, the voltage is kept constant across the arc, having been pre-set on the power supply generator. With the constant potential power source, a consistent arc length is maintained by utilizing any change in voltage across the arc, due to a change in arc length, to control the current output of the power source. The amount of current controls the burn-off rate of the electrode, thus maintaining the proper arc length. The feed rate of the electrode is maintained constant.

With the constant current power source, arc length is properly maintained by sensing any change in voltage across the arc, due to a change in arc length, to control the feed rate of the electrode. The arc length is thus maintained while using a constant voltage and current power supply.

It is also possible to have the feed motor electrode feed rate and/or the feeder carriage rate of advance controlled by the electrical characteristics of the arc. Thus, in a constant potential type power supply, the arc length variations would control the current at the arc while the voltage would be kept constant. If the arc became shorter, the current would be increased to compensate. The electrode feed rate may be slowed to allow the arc length to increase. Since less weld material would be available per unit of time due to the slow feed rate, the carriage advance rate may also be slowed to maintain a weld bead of optimum size and weld characteristics. Should the arc length increase, the opposite compensations would take place. A carriage advance rate control may also be combined with the above-described constant current power supply system.

The straight wire electrode 34 is introduced into the feed rolls at a linear speed which is greater than the linear speed of the corrugated electrode 38 beyond the feed rolls. In order to form a solid weld bead the feed rate of the corrugated electrode 38 at the point of weld is several times greater than the linear rate of movement of the weld carriage in the direction of the weld being formed. Due to the corrugations of the electrode, it is effectively laid down along the line of weld in a zigzag pattern with each transverse corrugation of the pattern being immediately adjacent the previous corrugation. Due to the ratio of the feed rate of the corrugated electrode to the linear rate of movement of the carriage, each corrugation of the electrode is welded to the previous corrugation and a solid bead is formed which is equal to or in excess of the width of the corrugations in the electrode. The electrode feed rate may be increased or decreased relative to the linear carriage speed to form weld beads which range from a solid bead of constant width to a bead having a zigzag or intermittent pattern. The volume of material deposited to form a weld bead will vary with the ratio of the electrode feed rate to the linear carriage speed. A thicker weld bead will be formed with a higher ratio and a thinner bead will be formed with a lower ratio.

A deformed electrode may also be used to advantage in welding materials which are to be joined at an angle. With a straight line electrode, the electrode must be carefully placed and maintained at a position bisecting the angle formed by the materials to be welded in order to keep the arc running from the electrode to each of the plates to be welded together. If the electrode approaches one plate closer than it does the other plate, it will tend to be directed to the nearer plate and melt a portion of that plate only, instead of an equal portion of each. An acceptable weld will not then be obtained. By using a corrugated electrode, the electrode will alternately approach either plate at short intervals and will cause a weld bead to be formed which will be uniformly distributed between the two plates.

The method of welding which is the subject of the invention uses a deformed electrode which may be corrugated, as in the machine above described, in order to form a more desirable weld under certain circumstances. The electrode may also be deformed in other shapes, for example, as sine waves, spirals, and corrugations in two or more planes.

Other provisions may also be made to obtain a deformed electrode. For example, a straight electrode may be positively fed between a first pair of rollers at a predetermined rate and pass through a guide slot having a desired cross section and then to a second pair of feed rolls which positively feed the electrode at a slower rate than the first rolls. Due to the difference in feed rates the electrode will be deformed in the guide slot and will pass through the second pair of electrodes in a deformed state.

The machine and method of welding herein disclosed provides for stronger welds properly formed to join materials together having production variations which cannot be compensated for automatically with a straight electrode. They permit wider weld beads to be formed with relatively small cross-section area electrodes, thus increasing materially the welding range without a proportionate increase in the arc energy required.

What is claimed is:

1. An electrode feed and guide mechanism for a consumable welding electrode used in an automatic arc welding process, said mechanism including a feeder head and an electrode guide, said head having a pair of drivable intermeshed spur gears in spaced relation and adapted to receive said electrode intermediate said gears, said gears when driven being adapted to corrugate said electrode and feed said electrode to said guide at a controlled rate.

2. In an electrode feeding head for feeding a consumable electrode to material to be welded, a motor having a pair of shafts at least one of which is a driving shaft, a pair of feed rollers respectively mounted on said shafts and adapted to be rotated by said motor, each of said rollers having gear teeth formed thereon with a predetermined profile, said teeth being in meshed relationship, said shafts being so spaced that the pitch diameters of said teeth are spaced apart a distance substantially equal to the thickness of said electrode whereby said electrode may pass between said rollers and be deformed by said teeth.

3. In a machine for automatically welding a joint formed by materials having production variations whereby said joint varies from a determined line, a consumable electrode, a feeding head having a motor driving a pair of rollers at a determined rate, said rollers being adapted to receive said electrode therebetween and having intermeshing gear teeth formed on the peripheral edges thereof, said electrode being deformed by said rollers to the shape of the profiles of said teeth, and a guide for receiving said deformed electrode from said rollers and directing said electrode to said joint to be welded.

4. An electrode feeder head and guide for a consumable welding electrode, said head having a pair of spaced axially parallel rotatable and drivable gears with teeth in mesh, the pitch diameters of said teeth being spaced apart a distance substantially equal to the thickness of said electrode, said gears being adapted to receive said electrode therebetween, said electrode being adapted to be led between said gears and fed therethrough to said guide, said gears deforming said electrode to the profile of said gear teeth, said guide having a guide channel formed therein and a resilient guide head section mounted thereon whereby said deformed electrode may be guided to the material to be welded.

5. A method of arc welding materials having joint edge variations including the steps of simultaneously corrugating a consumable wire electrode and feeding said corrugated electrode at a controlled rate to the joint formed by said materials, establishing a welding arc between said electrode and said materials, and forming a weld bead at said joint.

6. A method of welding comprising the steps of simultaneously deforming a consumable wire electrode and feeding said deformed electrode at a predetermined rate to the point of weld, and heating said electrode whereby a weld bead is formed at said weld point.

7. In the art of welding a thin metal sheet joint having joint variations from a predetermined position, a method of welding comprising the steps of feeding a consumable straight wire electrode to a movable welding head, concurrently deforming said electrode in a plane transverse to the movement of said head and feeding said deformed electrode at a rate determined by the welding arc characteristics, guiding said electrode to a position adjacent said joint, and forming a weld bead wider than said joint variations.

8. Mechanism for laying a wide weld bead with a wire electrode having a small cross section area relative to the width of said weld bead, said mechanism comprising an electrode feed head adapted to move in a direction parallel to the direction of said weld bead and having an adjustment for swinging and securing said head in a plane generally transverse to said weld bead direction, said head having means for receiving a consumable electrode and electrode feeding and deforming gears and a deformed electrode guide for directing said electrode to said weld bead, said electrode being deformed by said gears in a plane of deformation substantially transverse to said weld bead direction whereby the tip of said electrode is fed alternately from side to side at said weld bead whereby said wide weld bead is formed.

9. A method of electric arc welding including the steps of simultaneously deforming a consumable electrode and feeding said deformed electrode at a controlled rate to the material being welded, establishing an electric arc between said electrode and said material, and controlling said feed rate in accordance with the electrical characteristics of said electric arc.

10. In an electrode feed and guide device for delivering a consumable electrode to a point to be welded, means for linearly advancing said electrode at a first predetermined rate and feeding said electrode to said point of weld at a second predetermined rate slower than said first rate, said means including a positive feed drive and an electrode guide.

11. A method for feeding a consumable electrode to a point of weld including the steps of feeding a first electrode section at a predetermined rate of advance, deforming said electrode, feeding a second section of said electrode at a predetermined rate of advance slower than said first rate, and directing said electrode to said weld point.

References Cited in the file of this patent

UNITED STATES PATENTS

| | | |
|---|---|---|
| 1,492,167 | Granger | Apr. 29, 1924 |
| 1,615,094 | McFarland | Jan. 18, 1927 |
| 1,907,051 | Emery | May 2, 1933 |
| 2,079,956 | Burgett | May 11, 1937 |
| 2,407,746 | Johnson | Sept. 17, 1946 |
| 2,759,083 | Richter et al. | Aug. 14, 1956 |